United States Patent
Liang

(10) Patent No.: US 8,744,517 B2
(45) Date of Patent: Jun. 3, 2014

(54) MOBILE TERMINAL WITH THE FUNCTION OF WIRED COMMUNICATION

(75) Inventor: Xiguang Liang, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 16 days.

(21) Appl. No.: 13/574,924

(22) PCT Filed: Feb. 22, 2011

(86) PCT No.: PCT/CN2011/071160
§ 371 (c)(1),
(2), (4) Date: Jul. 24, 2012

(87) PCT Pub. No.: WO2012/031469
PCT Pub. Date: Mar. 15, 2012

(65) Prior Publication Data
US 2012/0295659 A1 Nov. 22, 2012

(30) Foreign Application Priority Data
Sep. 6, 2010 (CN) .......................... 2010 1 0274145

(51) Int. Cl.
*H04M 1/00* (2006.01)

(52) U.S. Cl.
USPC ....................................... 455/552.1; 455/557

(58) Field of Classification Search
USPC ......... 455/556.1, 550.1, 552.1, 567, 566, 574
See application file for complete search history.

(56) References Cited

U.S. PATENT DOCUMENTS

| | | | |
|---|---|---|---|
| 5,787,365 A * | 7/1998 | Rivero et al. ................. | 455/567 |
| 6,615,051 B2 * | 9/2003 | Saarela ......................... | 455/522 |
| 6,836,644 B2 * | 12/2004 | Bacon et al. ................. | 455/74.1 |
| 7,024,189 B2 * | 4/2006 | Wonak et al. ............... | 455/426.2 |
| 7,190,954 B2 * | 3/2007 | Wonak et al. ............... | 455/426.2 |
| 7,657,284 B1 * | 2/2010 | Specht ........................ | 455/556.1 |
| 8,285,311 B2 * | 10/2012 | Hundal ........................ | 455/462 |
| 2002/0065076 A1 * | 5/2002 | Monroe ........................ | 455/426 |
| 2004/0203482 A1 * | 10/2004 | Bacon et al. ................. | 455/74.1 |
| 2006/0079280 A1 * | 4/2006 | LaPerch ....................... | 455/557 |
| 2009/0075602 A1 * | 3/2009 | Alexis .......................... | 455/74.1 |
| 2010/0159849 A1 * | 6/2010 | Tischer et al. ................. | 455/74 |

FOREIGN PATENT DOCUMENTS

| | | |
|---|---|---|
| CN | 1269948 | 10/2000 |
| CN | 28862539 | 1/2007 |
| CN | 201332429 | 10/2009 |
| GB | 2403869 | 4/2007 |

* cited by examiner

Primary Examiner — Blane J Jackson
(74) Attorney, Agent, or Firm — Brooks Kushman P.C.

(57) ABSTRACT

A mobile terminal is provided including: a fixed network access control module for connecting the terminal with an analog user line and notifying the central processor that the mobile terminal is connected with the fixed telephone network in the situation where the analog user line is connected to the analog user line interface; a dual-tone multi-frequency processing module for identifying a selecting signal from analog user line and sending it to central processor; a call processing module for extracting a voice signal on the analog user line, sending it to an audio output device, and sending a voice signal from user to the analog user line; a mobile communication module for achieving communication between the mobile terminal and the exterior; and the central processor for processing the signaling from dual-tone multi-frequency processing module and sending the signaling to be transmitted via network to the dual-tone multi-frequency processing module.

20 Claims, 8 Drawing Sheets

MOBILE TERMINAL WITH THE FUNCTION OF WIRED COMMUNICATION

CROSS-REFERENCE TO RELATED APPLICATION

This application is the U.S. national phase of PCT Appln. No. PCT/CN2011/071160 filed Feb. 22, 2011 which claims priority to Chinese Application No. 201010274145.2 filed Sep. 6, 2010, the disclosures of which are incorporated in their entirety by reference herein.

TECHNICAL FIELD

The present invention relates to the communication field, and particularly, to a mobile terminal.

BACKGROUND OF THE RELATED ART

With the continuous development of the telecommunication network, the broadcast television network and the Internet, currently, an idea of converging these three networks has already be proposed, and the tri-network convergence technology is developed continuously, and by way of converging these three networks, interconnection and intercommunication and resource sharing can be achieved among three networks, and a plurality of services such as voice, data and broadcast television and so on can be provided to the user. Actually, the essence of tri-network convergence is the convergence of the services of three networks, and the convergence of services finally will be embodied in the terminal inevitably, therefore, how to design a rational terminal for the trends of tri-network convergence will become a critical factor regarding whether or not tri-network convergence can be realized.

With the continuous expansion of the communication service scale of the mobile communication system, the restriction on the mobile communication system capacity which is imposed by the finiteness of the mobile communication resources (radio spectrum) has already appeared, and the industries has already considered to integrate the finite radio resources with the relatively infinite wired resources together, so as to make full use of the existing fixed telephone network resources and improve the capacity of the mobile communication system and user experience.

On the other hand, with the development of the society, the environmental awareness of the people also improves, and more and more people realizes the damage of the radio waves on the human health; at the same time, as to considerable mobile users, in most cases, they will be in the environment of fixed telephone network and they don't need to carry out mobile communication, for example, when the user is in the office or at home, although there is a fixed phone beside the user and he/she also carries the mobile phone, another user calling that user may not know whether there is a fixed phone in the environment where that user is located, and therefore, said another user will still call the mobile phone of that user when carrying out communicate with that user, which will obviously waste resources and cause unnecessary damage to the environment and the human body.

However, the current mobile terminal cannot communicate by using the more environmental friendly wired communication manner, and therefore, no effective solution is proposed for the above problem.

SUMMARY OF THE INVENTION

As to the problem in the related art that the mobile phone cannot communicate by using the wired communication manner and then causes serious resource waste and damage to the human body and environment during communication, a mobile terminal is proposed in the present invention, which can communicate by using the wired communication manner.

The technical solution of the present invention is achieved as follows:

a mobile terminal is provided according to one aspect of the present invention, comprising a central processor, a fixed network access control module, a dual-tone multi-frequency processing module, a call processing module, a mobile communication module and an electronic switch module.

In particular, the fixed network access control module connected to the central processor comprises an analog user line interface for connecting a terminal with an analog user line and notifying the central processor that the mobile terminal is connected with a fixed telephone network in a situation where the analog user line is connected to the analog user line interface; the dual-tone multi-frequency processing module connected to the central processor is for identifying a selecting signal from the analog user line, sending the selecting signal to the central processor and sending the selecting signal from the central processor to the analog user line; the call processing module is for extracting a voice signal on the analog user line, sending the voice signal to an audio output device of the mobile terminal for playing, and sending a voice signal from a user to the analog user line; the mobile communication module is for achieving communication between the mobile terminal and an exterior based on a wireless network; and the central processor is for processing a signaling from the dual-tone multi-frequency processing module, sending the signaling which needs to pass through a user line to the dual-tone multi-frequency processing module, and controlling the electronic switch module to close a radio frequency function of the mobile communication module in a situation where the fixed network access control module notifies that the mobile terminal is connected with the fixed telephone network.

The mobile terminal can further comprise: a ringing current processing module, which is connected to the central processor and is for identifying a ringing current signal from the analog user line and sending a ringing corresponding to the ringing current signal to the central processor.

Moreover, the mobile terminal can further comprise: a signal tone processing module, which is connected to the central processor and is for identifying a signal tone from the analog user line and sending information of the signal tone to the central processor.

Moreover, the central processor is further for determining whether or not a called terminal of a call corresponding to the ringing current signal is the mobile terminal according to a called terminal identifier of an incoming call received by the dual-tone multi-frequency processing module and controlling the mobile terminal to carry out call prompt in a situation where a result is determined to be yes.

In addition, the electronic switch module is further for connecting at least one of the dual-tone multi-frequency processing module, the call processing module and the ringing current processing module to the analog user line under control of the central processor.

Moreover, the central processor is used for controlling the electronic switch module to connect the ringing current processing module to the analog user line in a situation where the mobile terminal accesses the fixed telephone network.

Moreover, the central processor is for controlling the electronic switch module to connect the call processing module to the analog user line in a situation where the mobile terminal needs to carry out a call.

In addition, the mobile terminal further comprises an audio input/output module, wherein the call processing module is for sending a voice signal which is generated by a user through an audio input module to the analog user line, and sending the voice signal from the analog user line to the audio output module.

Furthermore, the electronic switch module is further for connecting the audio input/output module to the call processing module or the central processor under control of the central processor.

Preferably, the central processor is one of following: a baseband processor and a central processing unit.

By way of the above technical solution of the present invention, by modifying the mobile terminal and configuring the function modules for signaling processing, voice signal processing, and connecting to the analog user line, the mobile terminal can access and reside in the fixed telephone network and can carry out voice signal interaction and signaling (including short message) interaction with the fixed telephone network via the analog user line, thus, convergence of mobile communication and fixed telephone network communication is achieved for the mobile terminal, and the function of wired communication can be added on the basis of reserving the mobile communication function, reducing the damage of the radio wave radiation to human body health and environment and saving radio resources.

PREFERRED EMBODIMENTS OF THE PRESENT INVENTION

In order to overcome the problem in the related art that the mobile phone cannot communicate by using the wired communication manner and the serious resource waste and damage is caused to the human body and environment during communication, in the present invention, the following factors are taken into account: the current fixed telephone network technology is relatively improved, the network coverage is relatively overall and the network scale is still developed and expanded continuously and so on, and it is proposed that by modifying the mobile terminal, the mobile terminal can access and reside in the fixed telephone network and can carry out voice signal interaction and signaling (including short message) interaction with the fixed telephone network via the analog user line, thus, the convergence of mobile communication and fixed telephone network communication is achieved for the mobile terminal, and the function of wired communication can be added on the basis of reserving the mobile communication function, thereby reducing the damage of the radio wave radiation to human body health and environment and reducing the waste of radio resources.

Hereinafter, the present invention will be described in detail in conjunction with the accompanying drawings.

Figure 1:
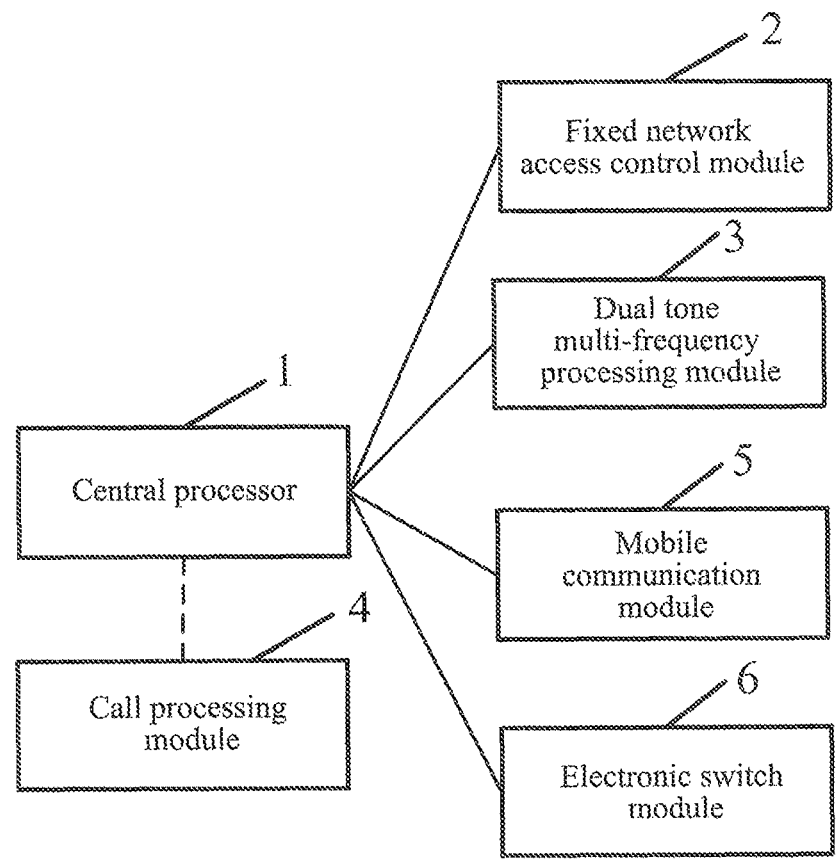
FIG. 1 is a structural block diagram of a mobile terminal according to the embodiments of the present invention.

FIG. 1 is a structural block diagram of a mobile terminal according to the embodiments of the present invention, and as shown in FIG. 1, it includes a central processor 1, a fixed network access control module 2, a dual-tone multi-frequency processing module 3, a call processing module 4, a mobile communication module 5 and an electronic switch module 6, wherein the fixed network access control module 2 is connected to the central processor 1, comprising an analog user line interface for notifying the central processor 1 that the mobile terminal is connected with the fixed telephone network in the situation where the analog user line is connected to the analog user line interface, and further for notifying the central processor 1 to control the mobile terminal to be disconnected from the fixed telephone network in the situation where the analog user line is disconnected from the analog user line interface;

the dual-tone multi-frequency processing module 3 connected to the central processor 1 is for identifying selecting signals from the analog user line, sending these selecting signals to the central processor 1 and sending a selecting signal from the central processor 1 to the analog user line;

the call processing module 4 is for sending a voice signal from the analog user line to an audio output module for playing, and sending a voice signal from a user to the analog user line;

the mobile communication module 5 is for achieving the communication between the mobile terminal and the exterior based on a wireless network;

the central processor 1 is for processing the signaling from the dual-tone multi-frequency processing module 3 and sending the signaling required to be transmitted via the network to the dual-tone multi-frequency processing module 3, and further for controlling the electronic switch module 6 to close the radio frequency transceiving function of the mobile communication module 5 in the situation where the fixed network access control module 2 notifies that the mobile terminal is connected with the fixed telephone network, wherein the central processor 1 is one of the following: a baseband processor or a central processing unit;

a ringing current processing module (not shown in FIG. 1) connected to the central processor 1 is for identifying a ringing current signal from the analog user line and sending the ringing corresponding to the ringing current signal to the central processor 1.

A signal tone processing module (not shown in FIG. 1) connected to the central processor 1 is for identifying a signal tone from the analog user line and sending the information of signal tone to the central processor 1.

An audio input/output module (microphone and earpiece) (not shown in FIG. 1), wherein the call processing module 4 is used for sending a voice signal inputted by the user via the microphone to the analog user line and sending the voice signal from the analog user line to the earpiece.

In this case, the central processor 1 is further used for determining whether or not the called terminal of the call corresponding to the ringing current signal is the present mobile terminal according to the called terminal identifier of the incoming call and controlling the mobile terminal to carry out subsequent call processing in the situation where the result is determined to be yes.

The electronic switch module 6 is further used for connecting at least one of the dual-tone multi-frequency processing module 3, the call processing module 4 and the ringing current processing module to the analog user line under the control of the central processor 1. In particular, the central processor 1 is used for controlling the electronic switch module 6 to connect the ringing current processing module to the analog user line in the situation where the mobile terminal accesses the fixed telephone network; the central processor 1 is used for controlling the electronic switch module 6 to connect the call processing module 4 to the analog user line in the situation where the mobile terminal needs to carry out a call; and the central processor 1 is used for controlling the electronic switch module to connect the audio input/output module to the call processing module in the situation where the mobile terminal is during a call.

Since the above mobile terminal according to the present invention is integrated with the functions of the fixed telephone network communication and the mobile network communication, hereinafter, the mobile terminal in the present invention is also referred to as converged terminal.

Figure 2:
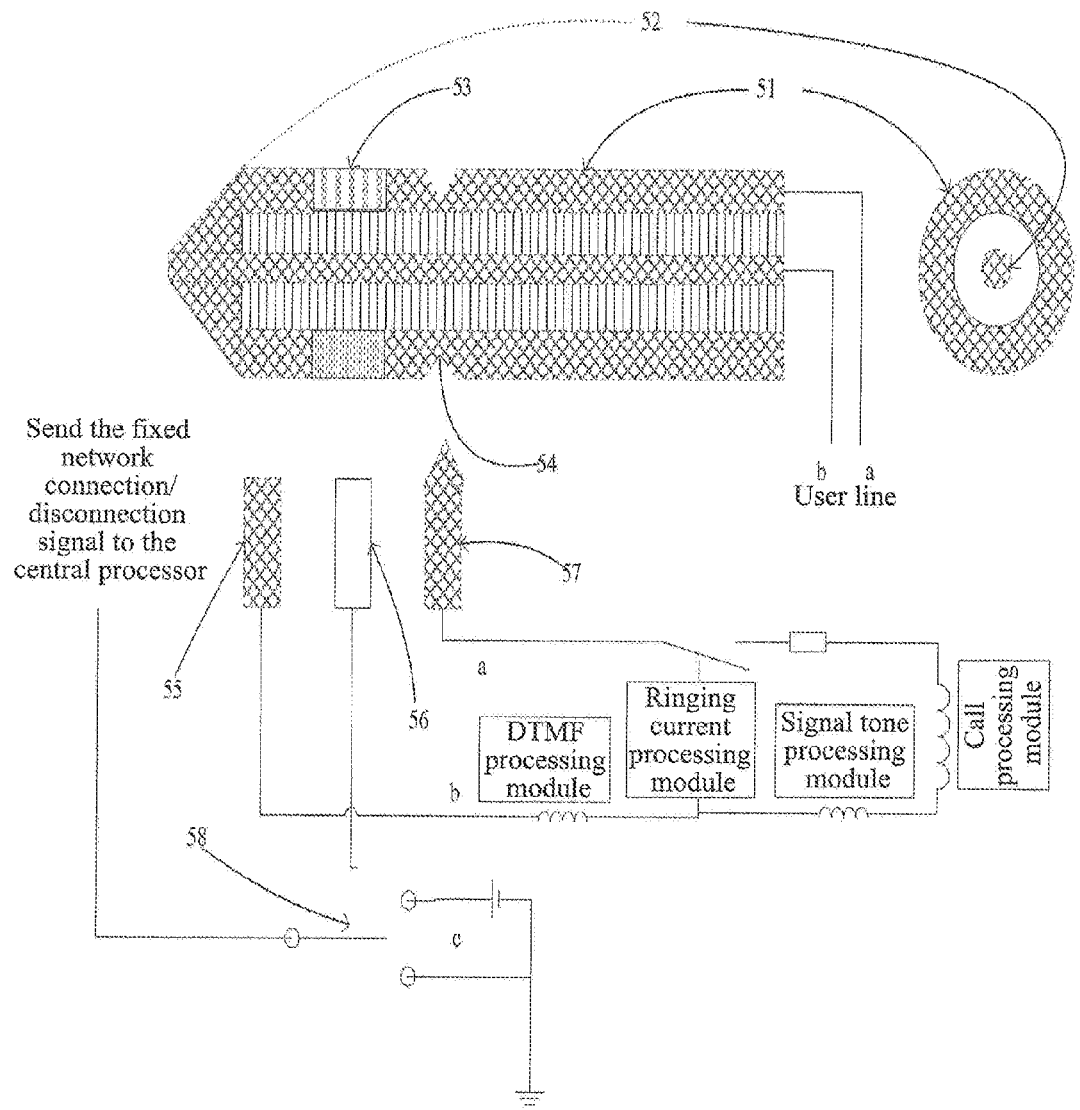
FIG. 2 is a schematic diagram of a fixed network access control module in a converged terminal according to the embodiments of the present invention.

FIG. 2 is a schematic diagram of a fixed network access control module in a converged terminal according to the embodiments of the present invention, which is mainly the shape of the user line plug and the method for connecting it to the terminal. There can be various shapes of plug, for example, the key switch can be controlled by the top of the plug and so on, and the position of the socket can be arranged at the lower portion of the converged terminal. By way of the fixed network access control module, on one hand, the ab line inside the converged terminal can be connected to the analog user line of the fixed telephone network, and then the converged terminal is connected to the fixed telephone network via the analog user line, on the other hand, the converged terminal can also timely detect the plugging and unplugging of the plug and notify the central processor of the connection and disconnection of the user line so as to start to access or exit the processing logic.

As shown in FIG. 2, the user line plug is in the shape of cylinder, wherein the left upper portion is a vertical cross section of the plug, the right upper portion is a lateral cross section of the plug and the lower portion thereof is the corresponding component inside the socket of the converged terminal. The external of the outer layer 21 of the plug is a layer of metal housing, which is used for connecting line a of the user line; the center of the inner layer 22 of the plug is a metal core for connecting line b of the user line; the insulation layer 23 is used for isolating lines a and b; and the groove 24 matches the protrusion 27. After the plug is plugged into the socket, the protrusion is snapped inside the groove for preventing the plug from slipping; three contacts 25, 26 and 27 are arranged inside the socket which correspond to line b inside the converged terminal, the connection detection switch and line a inside the terminal respectively, wherein the contacts 25 and 27 are metal contacts, and after the plug is plugged in, lines a and b inside the terminal can be connected to the external user line; the spring contact switch 28 can switch on low level under the push of the contact 26 after the plug is plugged in, so as to notify the central processor that the plug is plugged in; and when the plug is not plugged in, the spring contact switch 28 switches on high level so as to notify the central processor that the plug is not plugged in.

In the present invention, the device achieving the convergence of mobile terminal and fixed terminal (also referred to as converged terminal) and carrying out communication by using the existing analog user line in the fixed communication network includes MS (mobile converged terminal, also referred to as converged terminal), fixed telephone network and mobile communication network.

Figure 3:
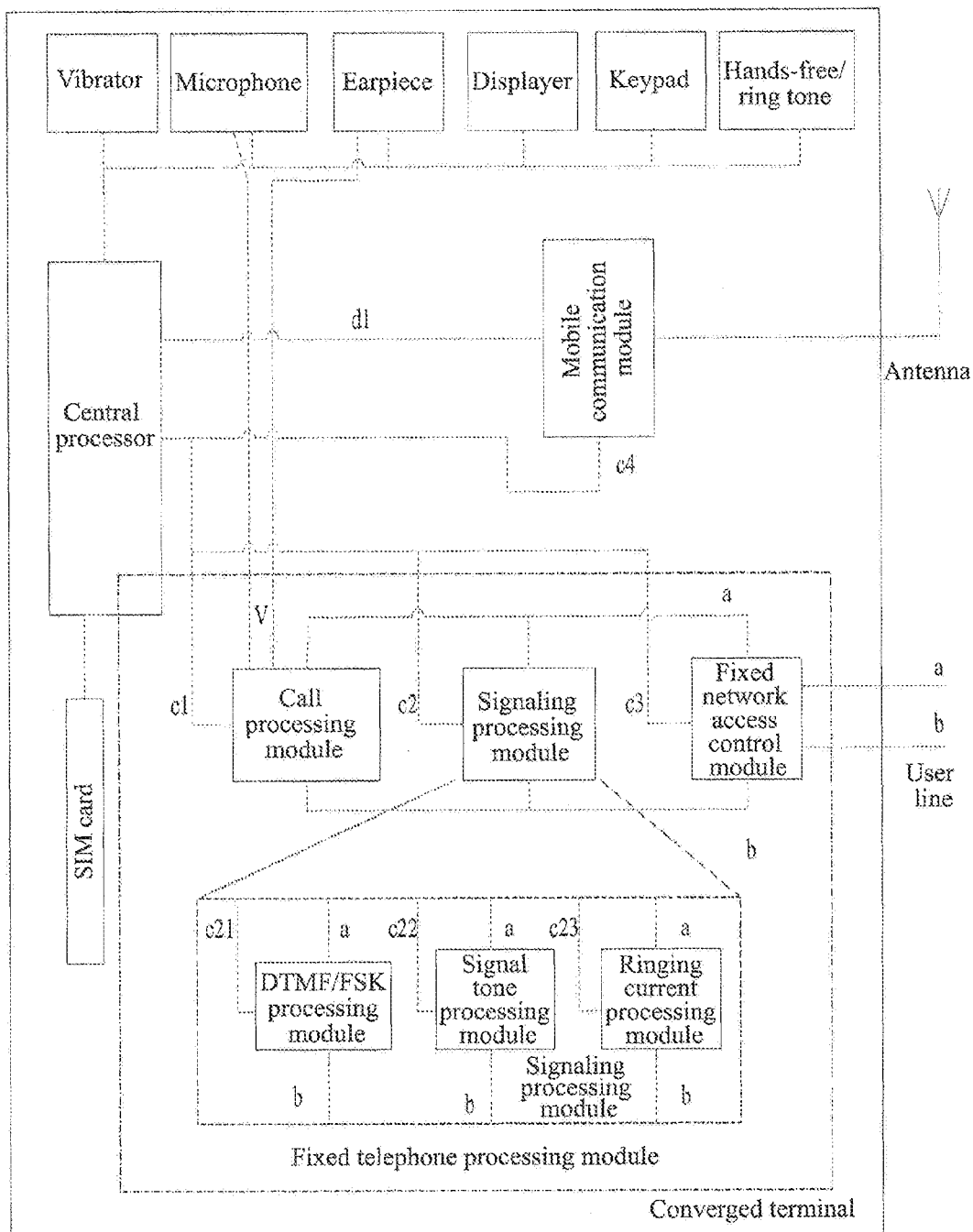
FIG. 3 is a particular structural block diagram of a converged terminal according to the embodiments of the present invention.

FIG. 3 is a particular structural block diagram of a converged terminal according to the embodiments of the present invention, and as shown in FIG. 3, the converged terminal has two interfaces, one is wireless, and the other is user line. The signaling over the wireless interface is identical to that of the wireless interface between the mobile terminal and the mobile communication network in the related art, which need not be described here; the user line interface is basically the same as the interface between the analog fixed telephone and fixed telephone network in the related art, except the following aspects: whether the converged terminal accesses the convergence network or the converged terminal initiates a call, the numbers sent over the user line include one special service number, the present terminal number (calling number) and the corresponding operation code, so as to indicate for the convergence network that the service request is from the converged terminal, the converged terminal example initiating the service request and the requested service.

In order to achieve the object that the converged terminal gains access by using the fixed network and communicates, one fixed network special service number of the converged terminal is specially configured (the converged terminal accesses the special service number of the convergence network via the fixed telephone network). Since the converged terminal can achieve three functions via the fixed telephone network: one is register, i.e. notify the network side that the converged terminal is gaining access via a certain user port of the fixed telephone network; the second is call, i.e. when the converged terminal gains access via the user line of the network, it can still obtain the same call service as mobile access; the third is call transfer, i.e. when the converged terminal is during a call, it can switch between mobile access and fixed access; and the fourth is the transmission of short message, i.e. the short message is sent via the fixed network. In order to distinguish these four functions, four operation codes can be configured. As such, if the common fixed telephone uses this port to initiate a call, then the logic processing thereof is identical to that of the related art; and if the converged terminal initiates a call, then it first dials the special service number and then the corresponding operation code so that the convergence network activates the corresponding processing. Of course, the dialing of the special service number and the operation code is automatically done by the converged terminal, and the operation method of the user is identical to the operation method of the mobile user communicating by using the mobile terminal in the related art.

As shown in FIG. 3, the converged terminal is composed of a mobile communication module, a fixed telephone processing module and a public portion. In this case, the vibrator, displayer, keypad, microphone, earpiece and hands-free/ring tone are necessary input/output modules in the existing mobile terminal device and are shared by the mobile communication module and the fixed telephone processing module in the converged terminal; the central processor can be a (digital) baseband processor in the existing mobile terminal and can also be a single CPU (central processing unit), such as the CPU in the netbook, for controlling the behavior of the converged terminal in an overall manner. In this case, the mobile communication module completes the mobile communication function in the related art under the control of the central processor and can switch on or off the radio frequency transceiving function of the mobile communication module under the control of the central processor.

The fixed telephone processing module of the converged terminal is composed of a fixed network access control module, a signaling processing module and a call processing module, wherein the signaling processing module is composed of a DTMF/FSK processing module, a signal tone processing module and a ringing current processing module. Inside the converged terminal, when idle, the ringing current processing module is connected to lines a and b (user line), and when during a call, the direct current loop of the user line is switched on, and the call processing module is connected to lines a and b. Inside the converged terminal, all these modules cooperatively work under the uniform control of the central processor and complete the call processing wider the fixed telephone network access mode.

The call processing module can switch on or off the connection to lines a and b under the control of the central processor so as to realize and terminate voice communication and realize 2/4 line transfer, anti-side tone, amplification of voice signal and receiving and sending the voice signal. The call processing module shares the earpiece and microphone modules with the mobile communication module, so it has to meet corresponding technical requirements on the input/output of these modules, and it has to make corresponding signal conversion when necessary.

The fixed network access control module can detect the plugging and unplugging of the user plug timely and notify the central processor of the connection and disconnection of the user line so as to start to access and exit the processing logic.

The signaling processing module achieves all the signal interaction functions between the converged terminal and the convergence network under the control of the central processor, and three sub-modules therein can switch on or off the connection thereof to lines a and b under the control of the central processor.

In particular, the ringing current processing module can switch on or off the connection thereof to lines a and b under the control of the central processor. When the converged terminal is idle, the ringing current processing module is always connected to lines a and b so as to monitor the ringing current which may appear on lines a and b. After the user as the called party presses the off-hook key, the ringing current processing module is disconnected from lines a and b under the control of the central processor, and at the same time, it switches on the user line loop under the control of the central processor so that the call processing module is connected to lines a and b so as to start a call. After the call is ended, the user presses the on-hook key, and the central processor controls the ringing current processing module to be connected to lines a and b and switch off the user line loop at the same time. In addition, the main task of the ringing current processing module is to identify a ringing current signal over the line and reports the appearance of the ringing current to the central processor when there is a ringing current signal over the line so that the central processor controls the hands-free/ring tone to make a ring or/and drive the vibrator to vibrate.

The function of the signal tone processing module is to identify tone signals such as dialing tone, ring-back tone, busy tone and so on over the line and reports the appearance thereof to the central processor.

On one hand, the DTMF/FSK processing module converts related number digits from the central processor into a DTMF/FSK signal to be sent to the user line when the converged terminal as the calling party initiates a call, on the other hand, after the ringing current processing module detects a ringing current, the DTMF/FSK starts to monitor and identity the DTMF/FSK signal of the calling number which may appear over the user line and send them to the central processor. DTMF/FSK is also responsible for transceiving data of short messages.

A pair of analog user lines can be connected to a plurality of different above mobile terminals, and different converged terminals are distinguished from each other by the telephone number thereof. If one converged terminal is the calling party, then the calling number of the outgoing call is the user number corresponding to the converged terminal. The number of one converged terminal which is taken by another user as the called party, and then there is only the converged terminal ringing of the called party. The user line port occupied by the converged terminal when accessing the network can still correspond to one fixed telephone number, and the behavior logic thereof is the same as that of other common ports, and when that port is taken as the called party, if there is still a fixed telephone connected to the port, then the fixed telephone will also ring. If the fixed telephone as the calling party initiates a call, then the calling number is the fixed telephone number corresponding to the port, and the operation method is identical to that of the related art.

Hereinafter, the function and working process of the converged terminal in the embodiments of the present invention will be described in detail in conjunction with particular flows.

Figure 4:
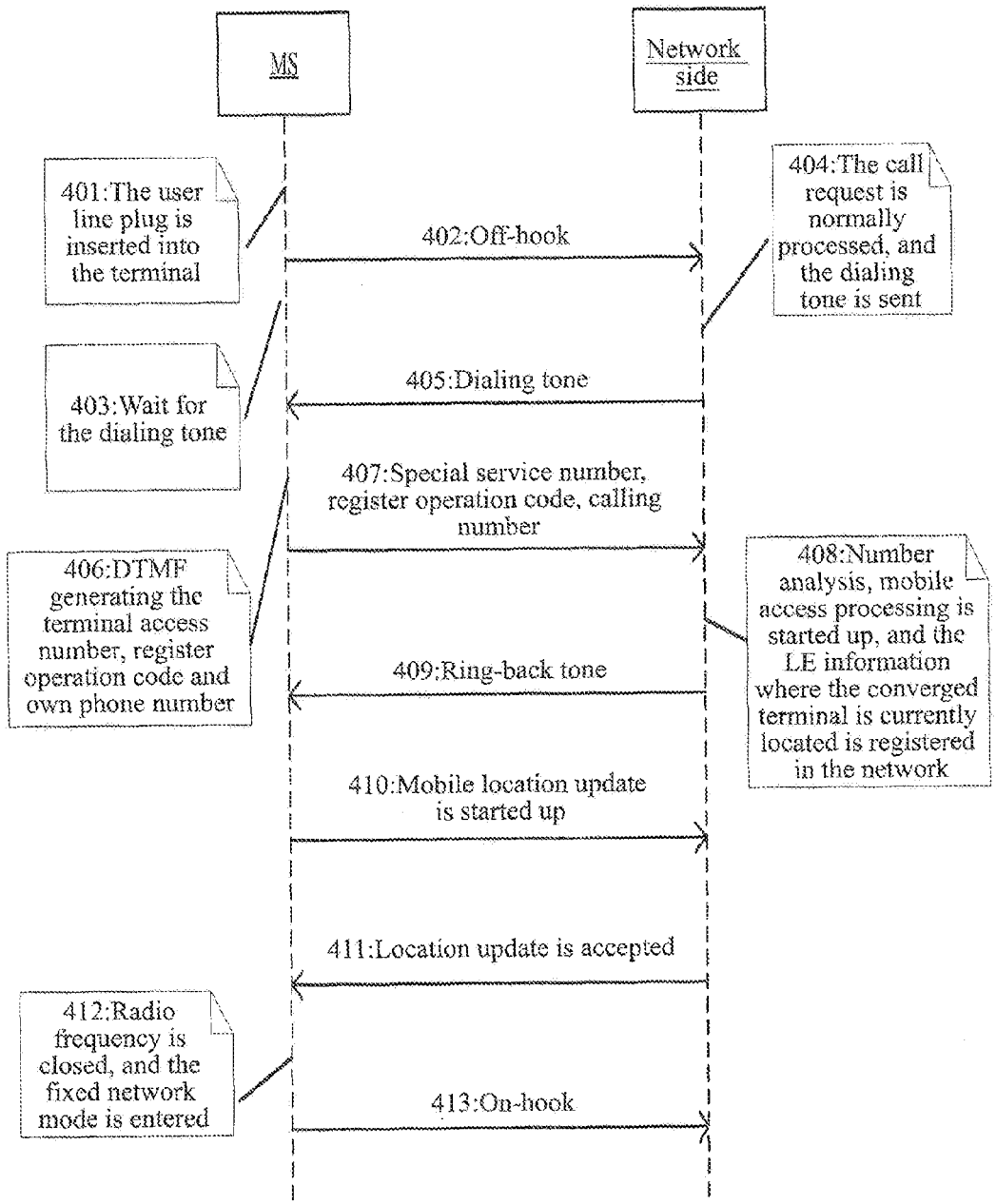
FIG. 4 is a processing flowchart of a converged terminal accessing the fixed telephone network when idle according to the embodiments of the present invention.

FIG. 4 is a processing flowchart of a converged terminal accessing the fixed telephone network when idle according to the embodiments of the present invention, and as shown in FIG. 4, it includes the following processing:

in step 401, after the user line plug is inserted into the user line socket of the converged terminal, the fixed network access control module in the converged terminal detects this event and reports it to the central processor; and the central processor controls the electronic switch to switch on the user loop and connect the DTMF/FSK processing module to the user line, and the central processor starts up the fixed telephone network access logic processing.

In step 402, the user loop is connected in the converged terminal, and the user interface circuit in the fixed telephone network can supply power to the user line loop, and the fixed telephone network detects that power supply, which is off-hook, that is to say, the converged terminal sends an off-hook event to the fixed telephone network and waits for the response from the network side.

In step 403, the central processor connects the signal tone processing module to the user line and waits for the response sent by the fixed telephone network, such as dialing tone.

In step 404, after detecting the off-hook event, the fixed telephone network starts up call processing, verifying the attribute of the port at the network side which is connected to the user line (for example, whether that port is available, if yes, then continue the following processing, otherwise the flow ends, and a busy tone is sent to the converged terminal), and other resources needed by this call (such as memory, thread and so on) are allocated.

In step 405, the fixed telephone network sends a dialing tone signal to the converged terminal.

In step 406, the signal tone processing module of the converged terminal identifies the dialing tone signal and notifies the central processor that the dialing tone signal has already been received so as to enable the central processor to perform the following access operation; the central processor reads the own phone number, special service number (for marking the service of the converged terminal) and register operation code from the SIM card and sends the above numbers to the DTMF/FSK module.

In step 407, the DTMF/FSK module converts the own phone number, special service number and register operation code into a DTMF/FSK signal and sends it to the fixed telephone network via the user line.

In step 408, the fixed telephone network analyzes the received numbers respectively, and determines this terminal is a converged terminal through the special service number, and determines the subsequent operation is access processing that the converged terminal in the idle state accesses the fixed telephone network through the register operation code; then the fixed telephone network and the mobile communication network perform the fixed telephone network access processing of the converged terminal together, and the own phone number of that terminal is added into the data of the user port of the corresponding access end office exchange in the fixed network and the current service location of that converged terminal is recorded in the VLR, HLR and MSC of the mobile network.

In step 409, after the fixed telephone network and the mobile communication network complete the access operation of the converged terminal, the end office exchange which the present converged terminal accesses in the fixed telephone network sends a ring-back tone signal to the user port where the converged terminal is located, and the converged terminal is notified that the access of the fixed telephone network is successful; the signal tone processing module of the converged terminal detects the ring-back tone signal and reports to the central processor that the ring-back tone signal has been received.

In steps 410 to 411, the central processor of the converged terminal instructs the mobile communication module to start up a location update flow toward the mobile communication network via an air interface so as to confirm the fixed telephone network access situation of the converged terminal, wherein that location update flow is the same as that in the related art, which need not be described here.

In step 412, the converged terminal switches off the radio frequency transceiving function of the mobile communication module, and radio waves are no longer transceived, and the resources allocated to this access are released, entering the fixed telephone network access operating mode.

In step 403, the converged terminal disconnects the user line loop, and an on-hook signal is sent to the end office exchange which the present terminal accesses, and the ringing current processing module is connected to the user line, entering the fixed telephone network access mode, and preferably, under the control of the central processor, all the other modules inside the converged terminal can be disconnected from the user line.

In this case, the above steps 410 to 411 are optional.

Figure 5:
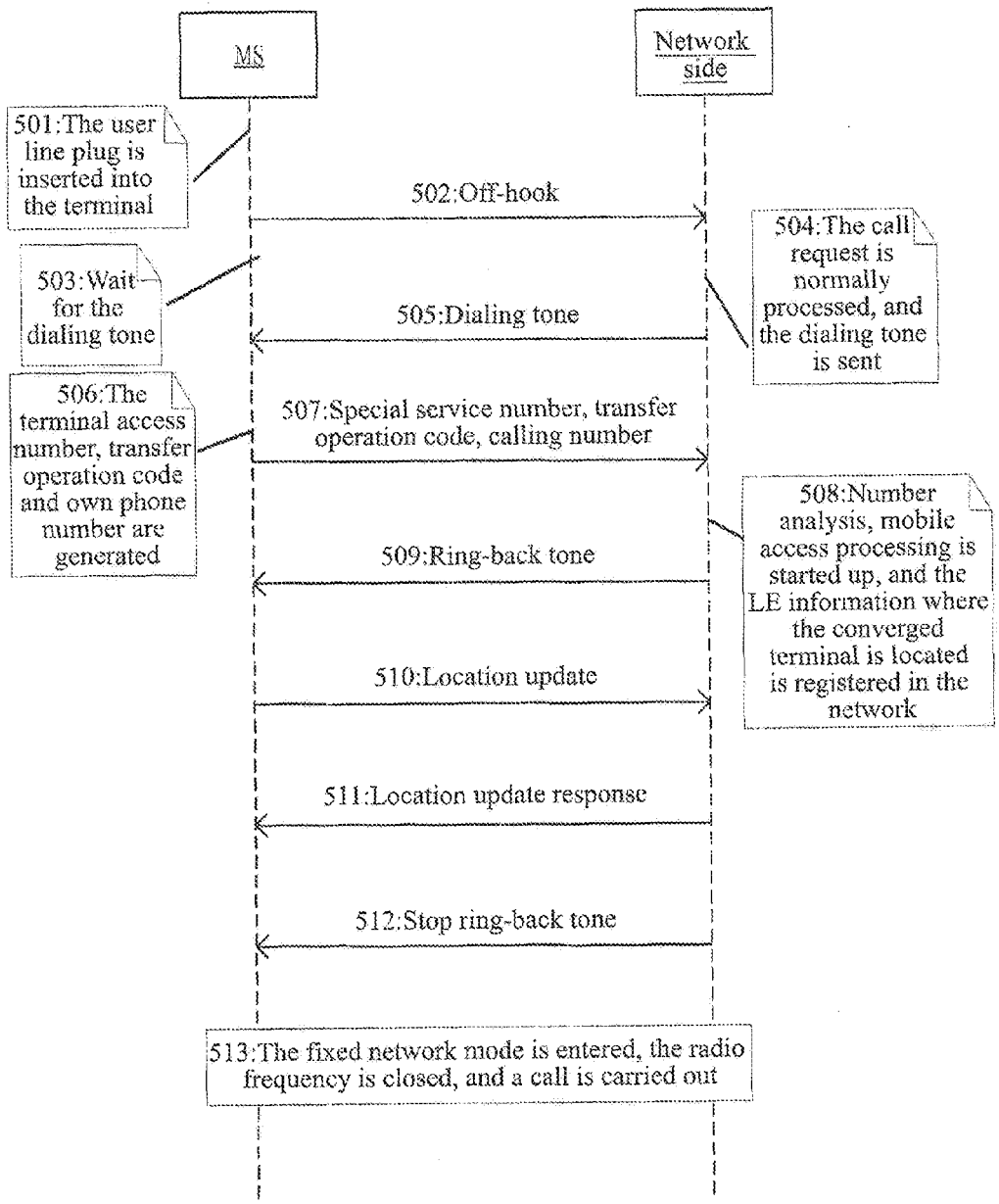
FIG. 5 is a processing flowchart of a converged terminal accessing the fixed telephone network during the call according to the embodiments of the present invention.

FIG. 5 is a processing flowchart of a converged terminal accessing the fixed telephone network when during a call according to the embodiments of the present invention, and as shown in FIG. 5, it includes the following processing:

in step 501, after the user line plug is inserted into the user line socket of the converged terminal, the fixed network access control module in the converged terminal detects this event and reports it to the central processor; and the central processor controls the electronic switch to switch on the user loop and connect the DTMF/FSK processing module to the user line, and the central processor starts up the fixed telephone network transfer logic processing.

In step 502, the user loop is connected in the converged terminal, and the user interface circuit in the fixed telephone network can supply power to the user line loop, and the fixed telephone network detects the power supply, which is off-hook, that is to say, the converged terminal sends an off-hook event to the fixed telephone network and waits for the response from the network side.

In step 503, the central processor connects the signal tone processing module to the user line and waits for the response sent by the fixed telephone network, such as dialing tone.

In step 504, after detecting the off-hook event, the fixed telephone network starts up call processing, verifying the attribute of the port at the network side which is connected to the user line (for example, whether that port is available, if yes, then continue the following processing, otherwise the flow ends), and other resources needed by this call (such as memory, thread and so on) are allocated.

In step 505, the fixed telephone network sends a dialing tone signal to the converged terminal.

In step 506, the signal tone processing module of the converged terminal identifies the dialing tone signal and notifies the central processor of the arrival of the dialing tone signal so as to enable the central processor to perform the following access operation; the central processor reads the own phone number, special service number (for marking the service of the converged terminal) and transfer operation code from the SIM card and sends the above numbers to the DTMF/FSK module. In this case, a state machine is provided in the central processor for identifying the operation required to be performed and sending the register operation code, or transfer operation code or origination operation code to the fixed telephone network.

In step 507, the DTMF/FSK module converts the own phone number, special service number and transfer operation code into a DTMF/FSK signal and sends it to the fixed telephone network via the user line.

In step 508, the fixed telephone network analyzes the received numbers respectively, and determines the terminal is a converged terminal through the special service number, and determines the subsequent operation is transfer processing that the converged terminal in the call state accesses the fixed telephone network through the transfer operation code, and then the fixed telephone network and the mobile communication network complete this fixed telephone network transfer processing of the converged terminal together, and the own phone number of that terminal is added into the data of the access port of the access end office exchange in the fixed network and the current service location of that converged terminal is recorded in the MSC, HLR and VLR of the mobile network.

In step 509, the access end office exchange of the fixed telephone network sends a ring-back tone to the converged terminal and the converged terminal is notified that the access of the fixed telephone network has been successful; and the signal tone processing module of the converged terminal detects the ring-back tone signal and reports to the central processor that the ring-back tone signal has been received.

In steps 510 to 511, the central processor of the converged terminal instructs the mobile communication module to start up a location update flow toward the mobile communication network via an air interface so as to confirm the fixed telephone network access situation of the converged terminal, wherein the location update flow is the same as that in the related art, which need not be described here.

In step 512, after the network side processes the access of the converged terminal, the end office exchange stops sending a ring-back tone to the terminal so as to indicate that the call can be continued, and the converged terminal detects the stop of the ring-back tone, and the radio frequency transceiving function of the mobile communication processing module is closed, and radio waves are no longer transceived, and the resources allocated to this access are released, entering the fixed telephone network access operating mode.

In step 513, the converged terminal under the control of the central processor connects the call processing module to the user line, and the converged terminal enters the fixed telephone network access mode, and the fixed telephone network and the converged terminal complete the transfer processing, and the mobile communication network switches the call path to the wired call path which is formed by the end office exchange of the fixed telephone network, the user line and the converged terminal, and both parties continue the call via the fixed telephone network.

In this case, the above steps 510 to 511 are optional.

Figure 6:
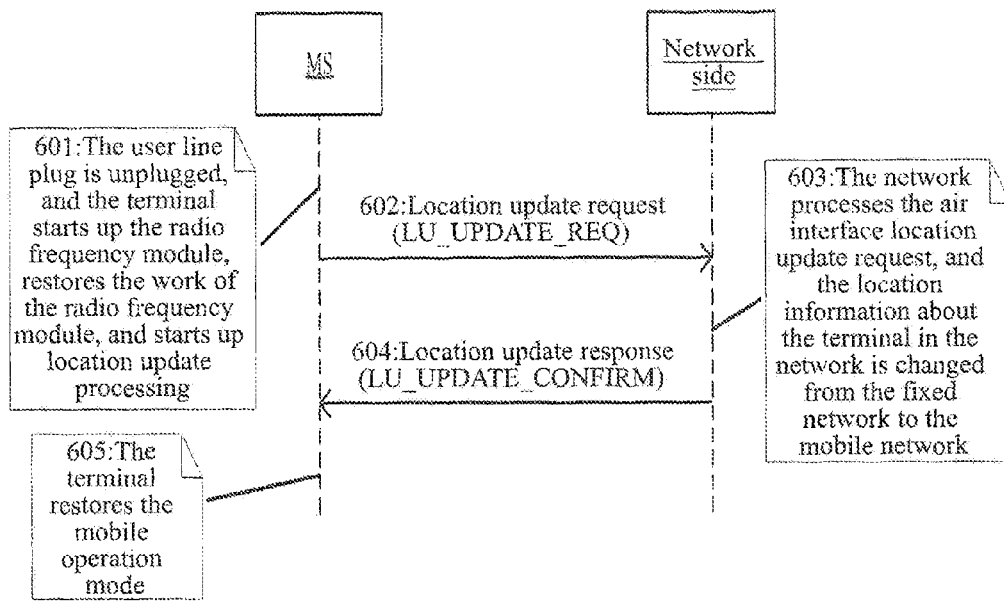
FIG. 6 is a processing flowchart of a converged terminal leaving the fixed telephone network when idle according to the embodiments of the present invention.

FIG. 6 is a processing flowchart of a converged terminal leaving the fixed telephone network when idle according to the embodiments of the present invention, i.e. the processing flowchart of the user line plug is unplugged from the converged terminal in idle state, and as shown in FIG. 6, it includes the following processing:

in step 601, after the user line plug is unplugged from the converged terminal in idle state, the fixed network access control module of the converged terminal detects the unplugging of the user line plug and notifies the central processor, and the central processor instructs the mobile communication module to start up the radio frequency transceiving function and start up the location update processing flow.

In steps 602 to 604, the converged terminal sends a location update request (LU_UODATE_REQ) to the mobile communication network, and the mobile communication network receives the location update request and changes the location information about the terminal in the network from the fixed telephone network to the mobile communication network. A location update response (LU_UPDATE_CONFIRM) message is also sent to the converged terminal so as to complete the location update of the converged terminal. In this case, the location update process is the same as that in the related art, which need not be described here.

In step 605, the converged terminal enters the mobile access mode.

Figure 7:
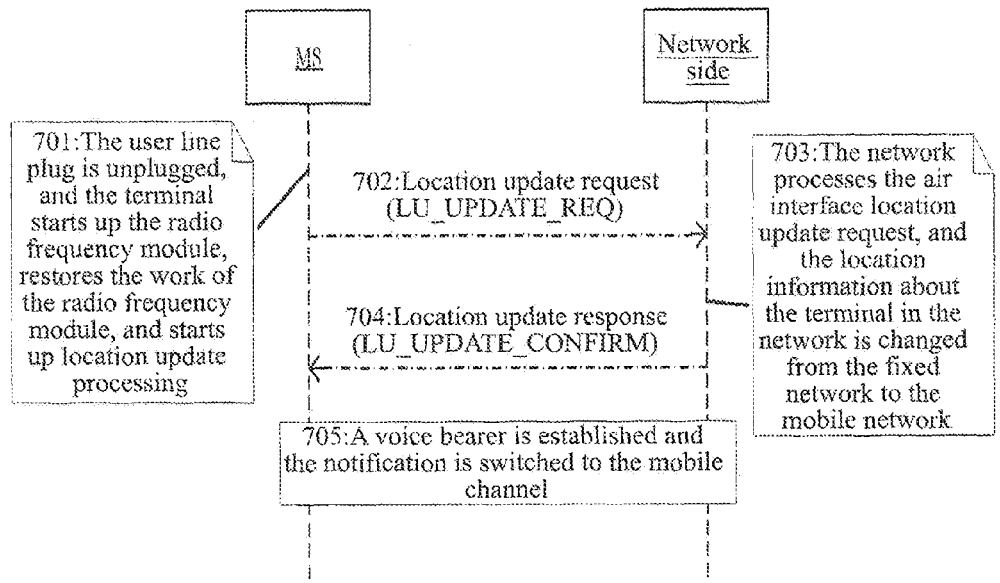
FIG. 7 is a processing flowchart of a converged terminal leaving the fixed telephone network during the call according to the embodiments of the present invention.

FIG. 7 is a processing flowchart of a converged terminal leaving the fixed telephone network when during a call according to the embodiments of the present invention, i.e. it is the processing flowchart after the user line plug is unplugged from the converged terminal in the call state, and as shown in FIG. 7, it includes the following processing:

in step 701, after user line plug is unplugged from the converged terminal in the call state (for example, the user in the call state unplugs the user line from the converged terminal, and if the user does not press the on-hook key, the call will be held, and the user can continue the call), the fixed network access control module of the converged terminal detects the unplugging of the user line plug, and the central processor instructs the mobile communication module to start up the radio frequency transceiving function and start up the location update processing flow.

In steps 702 to 704, the converged terminal sends a location update request to the mobile communication network, and the mobile communication network receives the location update request and changes the location information about the terminal in the network from the fixed telephone network to the mobile communication network, and a location update response message is sent to the converged terminal so as to complete the location update of the converged terminal, and at the same time the previous call of the converged terminal is held. In this case, the location update process is the same as that in the related art, which need not be described here.

In step 705, the mobile communication network establishes a voice bearer with the converged terminal and switches the call to the bear, and in particular, the mobile communication network and the converged terminal cooperate to establish a voice bearer which the air interface and the corresponding radio access device (such as BS, BSC and MSC) in the mobile communication network are involved in, and the call is switched to the voice bearer.

Figure 8:
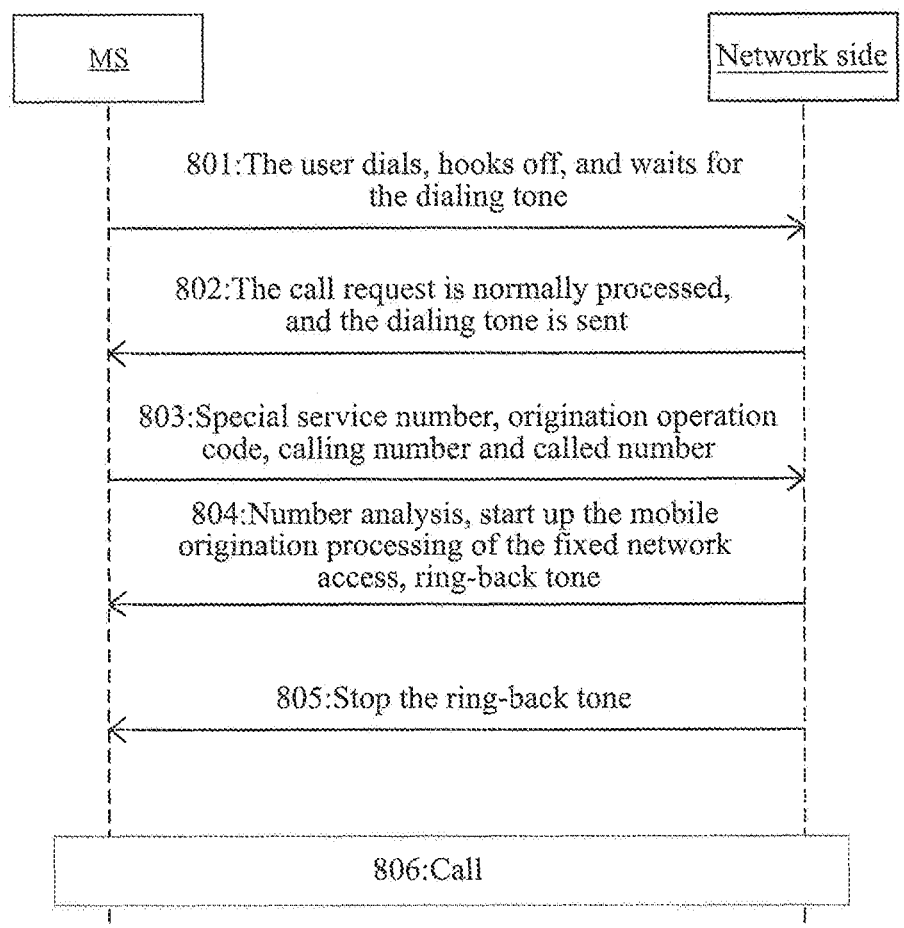
FIG. 8 is a flowchart of a converged terminal which accesses the fixed telephone network initiating call processing according to the embodiments of the present invention.

FIG. 8 is a flowchart of a converged terminal which accesses the fixed telephone network initiating call processing according to the embodiments of the present invention, and as shown in FIG. 8, it includes the following processing:

in step 801, after the user dials the number of the opposite party and presses the off-hook key (which is the same as the operation of the converged terminal under the mobile access mode), the central processor controls the electronic switch to connect the user loop and connect the DTMF/FSK processing module to the user line, and an off-hook signal is sent to the fixed telephone network, then the central processor controls the electronic switch to connect the signal tone processing module to the user line and waits for the reply of the network side.

In step 802, after having detected the off-hook event, the fixed telephone network starts up the call processing and sends a dialing tone signal to the converged terminal.

In step 803, the signal tone processing module of the converged terminal identifies the dialing tone signal and reports the reception of the dialing tone to the central processor. The central processor performs the subsequent call operation, reads the own phone number, special service number (for marking the service of the converged terminal) and origination operation code from the SIM card and sends above these numbers and the called number to the DTMF/FSK module; the DTMF/FSK module converts the special service number, origination operation code, own phone number and the called number into a DTMF/FSK signal, and sends it to the fixed telephone network via the user line. At the same time, the audio input/output module, the call processing module and the user line are connected.

In step 804, the fixed telephone network analyzes the calling number and the called number, and the outgoing origination processing of the fixed telephone network access of the converged terminal (that process is similar to that of the related art, which need not be described here) is started up, and then, after having ringed the called terminal, the network side sends a ring-back tone signal to the converged terminal.

In step 805, the called party hooks off, and the fixed telephone network stops sending the ring-back tone signal to the converged terminal.

In step 806, after having heard that the ring-back stops, the user can communicate with the called user via the converged terminal.

Optionally, in the flow shown in FIG. 8, the central processor can also connect the call processing module to the user line in any one step after step 801, so as to form a call loop.

Figure 9:
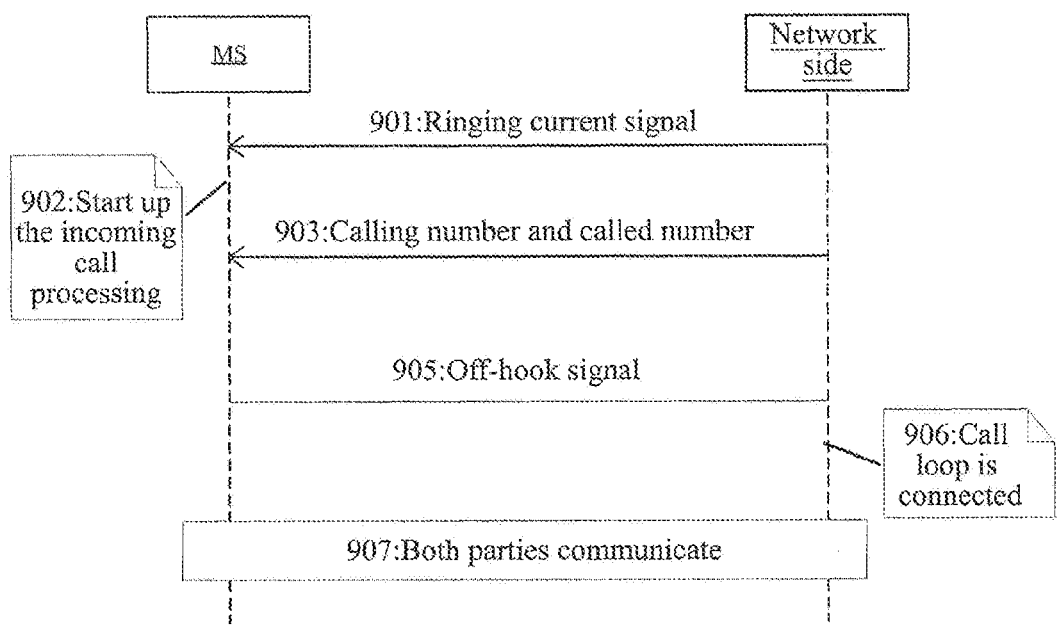
FIG. 9 is a flowchart of a converged terminal which accesses the fixed telephone network receiving call processing according to the embodiments of the present invention.

FIG. 9 is a flowchart of a converged terminal which accesses the fixed telephone network receiving call processing according to the embodiments of the present invention, and as shown in FIG. 9, it includes the following processing:

in step 901, after the incoming call of the called converged terminal arrives at the access end office exchange at the network side, and after having confirmed that the port where the converged terminal is located is idle, the end office exchange sends a ringing current to the user line connected to the converged terminal, i.e. the fixed telephone network sends a ringing current signal to the converged terminal.

In step 902, according to the flow shown in FIG. 5 in the embodiments of the present invention, after the converged terminal accesses the fixed telephone network and works, it will connect the ringing current processing module to the user line, and if the fixed telephone network sends a ringing current to the user line, the ringing current processing module of the converged terminal will identify that ring current and reports the arrival information about that ringing current to the central processor, and the central processor starts up the incoming call processing and connects the DTMF/FSK processing module to the user line.

In step 903, the fixed telephone network sends the calling number and the called number to the converged terminal via the DTMF/FSK module.

In step 904, the converged terminal compares the received called number with its own terminal number, if they are the same, then it sends the calling number to the displayer of the converged terminal for displaying and starts up an incoming call notification module (driving the hands-free/ringtone to ring, or/and the vibrator to vibrate) to notify the arrival of the incoming call, proceeding to step 905, and if they are different, then the processing on this call is stopped.

In step 905, the user views the main number displayed by the displayer and confirms to accept this call, then he/she presses the off-hook key, and the central processor connects the call processing module to the user line, connectting the call path, and an off-hook signal is sent to the fixed telephone network.

In step 906, the fixed telephone network connects the corresponding call path.

In step 907, the calling user and the user of the converged terminal start to communicate.

As to the implementation of the transceiving function of the short message, when sending a short message, it is started with the special service number and short message sending operation code, then short message center number and short message content; and when receiving a short message, the end office exchange of the fixed network sends the calling number, short message service center number, called number and then short message receiving time and short message content to the terminal. The terminal identifies it as a short message rather than a voice call by the short message service center number.

The mobile terminal in the embodiments of the present invention employs the existing analog user line to access the convergence network, and the fixed telephone network communication and mobile network communication technology can be converged, and the convergence network is accessed via the current large-scale 2-line analog user telephone line, and thus, by making full use of the relative infiniteness of the fixed communication network resources and the flexibility of the mobile network wireless communication, the communication can be carried out effectively and conveniently.

Above description is only the preferred embodiments of the present invention but not to limit the present invention, and any amendments, equivalent substitutions, improvements and so on within the spirit and principle of the present invention are all included in the protection scope of the present invention.

What I claim is:

1. A mobile terminal, comprising a central processor, a fixed network access control module, a dual-tone multi-frequency processing module, a call processing module, a mobile communication module and an electronic switch module, wherein the fixed network access control module connected to the central processor comprises an analog user line interface, configured to connect the mobile terminal with an analog user line and notify the central processor that the mobile terminal is connected with a fixed telephone network in a situation where the analog user line is connected to the analog user line interface;

the dual-tone multi-frequency processing module connected to the central processor is configured to identify a selecting signal from the analog user line, send the selecting signal to the central processor and send a selecting signal from the central processor to the analog user line;

the call processing module is configured to extract a voice signal on the analog user line, send the voice signal to an audio output device of the mobile terminal for playing and send a voice signal from a user to the analog user line;

the mobile communication module is configured to achieve communication between the mobile terminal and an exterior based on a wireless network;

the central processor is configured to process a signaling from the dual-tone multi-frequency processing module, and send a signaling which needs to pass through a user line to the dual-tone multi-frequency processing module, and control the electronic switch module to close a radio frequency function of the mobile communication module in a situation where the fixed network access control module notifies that the mobile terminal is connected with the fixed telephone network.

2. The mobile terminal according to claim 1, further comprising:

a ringing current processing module, which is connected to the central processor and is configured to identify a ringing current signal from the analog user line and send a ringing corresponding to the ringing current signal to the central processor.

3. The mobile terminal according to claim 2, wherein the central processor is further configured to determine whether or not a called terminal of a call corresponding to the ringing current signal is the mobile terminal according to a called terminal identifier of an incoming call received by the dual-tone multi-frequency processing module and control the mobile terminal to carry out call prompt in a situation where a result is determined to be yes.

4. The mobile terminal according to claim 3, further comprising an audio input module and an audio output module, wherein the call processing module is configured to send a voice signal which is generated by a user through the audio input module to the analog user line, and send a voice signal from the analog user line to the audio output module.

5. The mobile terminal according to claim 4, wherein the electronic switch module is further configured to connect the audio input module and audio output module to the call processing module or the central processor under control of the central processor.

6. The mobile terminal according to claim 2, further comprising an audio input module and an audio output module, wherein the call processing module is configured to send a voice signal which is generated by a user through the audio input module to the analog user line, and send a voice signal from the analog user line to the audio output module.

7. The mobile terminal according to claim 6, wherein the electronic switch module is further configured to connect the audio input module and audio output module to the call processing module or the central processor under control of the central processor.

8. The mobile terminal according to claim 1, further comprising:
a signal tone processing module, which is connected to the central processor and is configured to identify a signal tone from the analog user line and send information of the signal tone to the central processor.

9. The mobile terminal according to claim 8, further comprising an audio input module and an audio output module, wherein
the call processing module is configured to send a voice signal which is generated by a user through the audio input module to the analog user line, and send a voice signal from the analog user line to the audio output module.

10. The mobile terminal according to claim 9, wherein the electronic switch module is further configured to connect the audio input module and audio output module to the call processing module or the central processor under control of the central processor.

11. The mobile terminal according to claim 1, wherein the electronic switch module is further configured to connect at least one of the dual-tone multi-frequency processing module, the call processing module and a ringing current processing module to the analog user line under control of the central processor.

12. The mobile terminal according to claim 11, wherein
the central processor is further configured to control the electronic switch module to connect the ringing current processing module to the analog user line in a situation where the mobile terminal accesses the fixed telephone network.

13. The mobile terminal according to claim 11, further comprising an audio input module and an audio output module, wherein
the call processing module is configured to send a voice signal which is generated by a user through the audio input module to the analog user line, and send a voice signal from the analog user line to the audio output module.

14. The mobile terminal according to claim 13, wherein the electronic switch module is further configured to connect the audio input module and audio output module to the call processing module or the central processor under control of the central processor.

15. The mobile terminal according to claim 12, further comprising an audio input module and an audio output module, wherein
the call processing module is configured to send a voice signal which is generated by a user through the audio input module to the analog user line, and send a voice signal from the analog user line to the audio output module.

16. The mobile terminal according to claim 11, wherein
the central processor is further configured to control the electronic switch module to connect the call processing module to the analog user line in a situation where the mobile terminal needs to carry out a call.

17. The mobile terminal according to claim 16, further comprising an audio input module and an audio output module, wherein
the call processing module is configured to send a voice signal which is generated by a user through the audio input module to the analog user line, and send a voice signal from the analog user line to the audio output module.

18. The mobile terminal according to claim 1, further comprising an audio input module and an audio output module, wherein
the call processing module is configured to send a voice signal which is generated by a user through the audio input module to the analog user line, and send a voice signal from the analog user line to the audio output module.

19. The mobile terminal according to claim 18, wherein the electronic switch module is further configured to connect the audio input module and audio output module to the call processing module or the central processor under control of the central processor.

20. The mobile terminal according to claim 1, wherein the central processor is a baseband processor or a central processing unit.

* * * * *